(12) United States Patent
Carter (10) Patent No.: US 7,500,449 B2
(45) Date of Patent: Mar. 10, 2009

(54) BIRD HOUSE ASSEMBLY

(75) Inventor: Jim Carter, Denver, CO (US)

(73) Assignee: Woodstream Corporation, Lititz, PA (US)

( * ) Notice: Subject to any disclaimer, the term of this patent is extended or adjusted under 35 U.S.C. 154(b) by 266 days.

(21) Appl. No.: 11/161,348

(22) Filed: Jul. 29, 2005

(65) Prior Publication Data

US 2006/0065206 A1   Mar. 30, 2006

Related U.S. Application Data

(60) Provisional application No. 60/592,578, filed on Jul. 29, 2004.

(51) Int. Cl.
*A01K 31/00* (2006.01)
(52) U.S. Cl. ............... 119/429; 119/462; 119/473
(58) Field of Classification Search ............ 119/428, 119/429, 430, 431, 432, 433, 434, 435, 459, 119/462, 472, 473, 161, 165, 166, 480; D30/110
See application file for complete search history.

(56) References Cited

U.S. PATENT DOCUMENTS

| 4,444,148 | A | * | 4/1984 | Lander | 119/165 |
| 4,732,111 | A | * | 3/1988 | Runion | 119/165 |
| 6,009,837 | A | * | 1/2000 | McClasky | 119/428 |
| 6,079,364 | A | * | 6/2000 | Tamba | 119/163 |
| 2003/0168017 | A1 | * | 9/2003 | Perelli et al. | 119/165 |

* cited by examiner

*Primary Examiner*—T. Nguyen
(74) *Attorney, Agent, or Firm*—Jacobson Holman PLLC (57) ABSTRACT

A bird housing module is used to form a housing complex in a system for creating a habitat for nesting birds. The module includes a housing shell with an open front and an open-topped nest drawer that slideably fits into the shell. The nest drawer has a front drawer panel with an entryway for nesting birds. Ventilation openings and drain openings may be employed, and a predator guard panel may also be disposed in the nest drawer. A plurality of such modules may be connected to and extend radially from a carriage to form the housing complex. The system then includes a pole assembly having a pole and having a pulley and a cord for raising and lowering the carriage and housing complex on the pole. A plurality of housing complexes may be stacked for increasing the number of housing modules available for nesting.

37 Claims, 6 Drawing Sheets

BIRD HOUSE ASSEMBLY

BACKGROUND

The present invention generally relates to shelters for wild birds. More particularly, the present invention concerns a birdhouse assembly that attracts purple martins and encourages the successful breeding of this species.

Bird watching is a highly prevalent past time in both urban and rural areas. The world is full of birds of numerous varieties in an astounding array of colors and designs. Many people enjoy viewing birds of various types, and an industry has evolved around products directed to improving the ability of persons to closely observe birds in their natural environment. On one hand, many people venture into the outdoors, where binoculars and spotting scopes may be utilized to better view various birds in their natural habitats. Such an approach requires a certain degree of skill, however, in finding and spotting various species of birds. Another approach utilizes various means of attracting birds to one's residence or a desired viewing location, such as adjacent a home's porch or window, where birds may be viewed at one's leisure. For example, persons have used bird feeders, birdbaths, and the like to attract birds of various types to their homes.

Various species of birds can be attracted by providing suitable nesting sites that accommodate their needs and protect them from predators. Certain birds, such as purple martins and bluebirds are welcome additions to one's backyard because of the mutually beneficial relationship that exists between these birds and their "landlords". Purple martins, in particular, are highly desirable additions to one's backyard because they play such an important role in the control of mosquito population. In fact, studies have indicated that a single purple martin can eat up to 2,000 mosquitoes and other insects a day. In addition, purple martins are interesting and beautiful creatures that enjoy living together in colonies that enable one to observe their interactions with one another. They also possess superior flight capabilities that enable them to perform daily aerial acrobatics, which provides much enjoyment to many a birdwatcher.

Purple martins were first attracted to hollowed out gourds, which were placed about Native American villages. However, as Native American villages began to disappear, so did the gourds, and by the middle of the twentieth century, purple martins were nearly extinct. The near extinction of these remarkable birds prompted great efforts to understand their habits and provide housing suitable for nesting. Today, purple martins are totally dependent upon man-made housing and studies continue to reveal new ways to improve their nesting sites and encourage breeding.

There are general specifications that a suitable purple martin house should have to provide attract purple martins. For example, purple martin houses should be set between fifteen (15) and twenty (20) feet off the ground. Also, the nesting compartments should be large enough to accommodate both the adult-sized parents and approximately four (4) to six (6) nearly grown fledgings. Accordingly, many specifications recommend that the nesting compartment be at least 6"×6", but deeper compartments, such as those that measure between 8-12" from front to back, have been observed to offer better protection against predators. Textured floors in the nesting compartments are also beneficial because they help prevent abnormalities that develop if the infant slips while moving about in the compartment. Since purple martins prefer to live together in colonies, a plurality of individual nesting compartments can be grouped together to accommodate as many as a couple dozen pairs of purple martins.

Entryways into the nesting compartments should also be sized to permit entry by an adult sized purple martin and are preferably of a pattern that keeps out predator birds such as starlings. For example, studies have indicated that some predator birds, such as starlings, are unable to gain access to the nesting compartment through a crescent shaped entryway.

Additionally, to increase breeding success, it is important that the nesting compartments be properly managed. Interestingly, access to the individual nesting compartments during the nesting season has shown to encourage successful breeding because it allows for the regular monitoring and care of the nesting compartments. These so-called nest checks allow the landlord to discover whether the nests are being preyed upon by owls at night, or by hawks or other predator birds by day. Early detection of predator activity will enable a landlord to take certain precautions to save the remainder of the nest. Nest checks also permit the landlord to remove unwanted nests such as those made by birds not welcome in a purple martin house.

In order to carry out these nest checks, it is helpful for the purple martin house to be easily lowered in way that does not harm the eggs or infant birds. In fact, many purple martin houses currently in use or on the market are not capable of being lowered and their respective landlords may never realize that the nests are being preyed upon.

As a result, some purple martin houses appearing in the market place are capable of being lowered so as to permit the landlord to conduct nest checks. Assemblies that enable the birdhouses to be lowered, however, preferably return the birdhouse to its original position so that each nesting compartment is in the same relative position and compass direction. This is because after the purple martin house is again elevated back to its original location, the adult purple martins will typically only return to the nesting compartment based upon its compass direction. If the birdhouse is repositioned causing the adult purple martins to trespass on another's nest, the adult purple martin becomes confused, which often results in abandonment of the nests and eventual loss of the eggs or fledglings.

To encourage the successful breeding of purple martins, then, improved housing assemblies are needed that protect purple martin nests from predators and enable their landlords to perform nest checks. While various housing assemblies currently in use today meet some of the minimum specifications, such as compartment sizes and entryway dimensions, nesting compartments are still readily accessible by predators. Additionally, typical nesting compartments are easily exposed to wind-blown rain, which dampens the nest and may result in a loss of the featherless infants that will become chilled in a damp nest. Further, now that studies have indicated the importance of monitoring the nesting compartments of the purple martin houses during the nesting season, it is desirable to provide an improved assembly that safely and efficiently permits the landlord to perform the nest checks.

SUMMARY OF THE DISCLOSURE

The embodiments disclosed herein relate to housing systems that may be employed as a habitat for nesting birds. The embodiments disclose more particular relate to a bird housing system that comprises a pole assembly having at least one bird housing complex slideably mounted to the pole of the pole assembly. The bird housing complex generally includes a carriage and a plurality of bird housing modules extending radially therefrom. Another aspect of these embodiments is the structure of the bird housing modules that make up the bird housing complex.

The bird housing module generally includes a housing shell and a nest drawer adapted to be slidably received therein. More particularly, the housing shell includes a shell bottom wall, a shell top wall, a pair of shell sidewalls, a closed shell back, and an open shell front to define an open shell interior. The nest drawer is slidably received in open shell interior when in a mounted state and removeable therefrom toward the open shell front of the housing shell. The nest drawer includes a drawer bottom wall, a pair of drawer sidewalls, and a closed drawer back respectively confronting the shell bottom wall, the shell sidewalls, and the shell back when in the mounted state. The nest drawer includes a front drawer panel or entrance panel and has a drawer interior with a top drawer opening that allows access into the drawer interior. The front drawer panel has an entryway therethrough to allow the ingress and egress of a nesting bird.

The housing shell may further include a plurality of ventilation openings formed therethrough that are sized and adapted to permit the passage of air into and out of the drawer interior when in the mounted state. The housing shell may be constructed so as to have a shell back wall and each side shell wall may further be provided with a proximate shell sidewall section and a distal shell sidewall section. The proximate shell of sidewall section is adjacent to the shell back wall and each proximate shell sidewall section is oriented at an angle of approximately 60 degrees to each other. The distal shell sidewall section is adjacent to each respective proximate shell sidewall section. The shell top wall may be formed of a pair of shell top wall sections that are formed along an eave.

The nest drawer may be provided with a predator guard panel located rearwardly of the front door panel and in spaced relation thereto. The predator guard panel is sized and adapted to obstruct access of a predator into the drawer interior while permitting access therein by the nesting bird. The predator guard panel may be provided with an access port formed therethrough that allows ingress and egress of a nesting bird. The access port is preferably laterally offset from the entryway of the front door panel. The nesting drawer bottom wall may be provided with a surface depression to generally define a nesting a region within the drawer interior. Further, a plurality of drainage apertures will be provided that are formed through the drawer bottom wall at a location generally located in the surface depression. The drawer bottom wall may be terraced so as to include a first bottom wall section located proximate to the closed drawer back and a second bottom wall section extending forwardly of the first bottom wall section and located at a lower position relative thereto. A third bottom wall section may be provided that extends forwardly of the section bottom wall section and located at a lower position relative thereto. The third bottom wall section may terminate in a railing to define a perch for a bird.

The bird housing module may also include an entrance plug that is sized and adapted to be removeably secured relative to the front drawer panel thereby to block the entryway of the front drawer panel to prevent the ingress and egress of a bird into the drawer interior. A coupling member may also be provided that is adapted to releasably secure the nest drawer in the housing shell when in the mounted state. The coupling member may be in the form of a spring clip that is supported by the drawer bottom wall and that releasably engages the shell bottom wall.

As mentioned above, another aspect of the present invention is a bird housing complex which provides a habitat for a nesting bird. The bird housing complex includes a plurality of bird housing modules that are adapted to be secured to and extend radially from a carriage. The carriage may be formed by a pair of connectable sections and be generally hexagonal in configuration so as to have six sides. Accordingly, when six bird housing modules extend radially from the carriage, each respective closed shell back the bird housing modules generally confront a respective one of the six sides of the carriage.

The carriage may be provided with a central passageway as well as a pair of spaced apart openings. Further, a plurality of carriages may be provided whereby one carriage is releasably secured to another.

The birdhousing complex may also include a locking collar secured to a carriage. The locking collar includes a latch mechanism. The locking collar includes a collar bottom wall that has a central collar passageway that is adapted to align with the central passageway of the carriage. The latch mechanism includes a central latch passageway formed therethrough that is also adapted to align with the central passageway of the carriage.

Yet another aspect of the present invention is a birdhousing system to provide a habitat for nesting birds. The birdhousing system comprises a pole assembly adapted to be positioned in an upright state relative to a support surface. The pole assembly includes an elongated pole of a selected length and has a lower end portion and an upper end portion. A pulley assembly is disposed on the upper end portion of the pole and a cord is associated with that pulley assembly. At least one bird housing complex, such as described above, is adapted to be slideably mounted on the pole. The housing complex is moveable between a lowered position proximate to the lower end portion of the pole and an elevated position proximate to the upper end portion of the pole. The housing complex includes a carriage connected to a first end portion of the cord, and a plurality of bird housing modules that extend radially therefrom whereby each of the housing modules provides an independent nesting region for the birds. A user may grasp a second end portion of the cord such that the housing complex can be translated on the pole between the lowered position and the upper position by means of the pulley assembly.

The carriage associated with the birdhousing system has a centrally located passageway that is sized and adapted to receive the pole as well as a pair of spaced apart openings that are sized and adapted to permit passage of the cord therethrough. A locking collar associated with the birdhousing system is supported by the pole and connected at a first end portion of the cord. The locking collar is operative to lock undesired movement of the housing complex from the elevated to the lowered position. The locking collar is associated with a latch mechanism.

The locking collar may include a collar bottom wall that has collar passageway formed therethrough that is sized and adapted to receive the pole. The latch mechanism associated therewith may include a moveable latch plate that is supported by the collar bottom wall and that is moveable between a release state wherein the latch plate is generally parallel to the bottom wall, and a latched state where the latch plate is oriented at an angle relative to the collar bottom wall. The locking collar may also be provided with an actuator lever operative to move the latch plate between the release state and the latch state. The actuator lever has a cord opening that is sized and adapted to receive the cord therethrough so that movement of the actuator lever is controlled by the cord. The locking collar may be releasably secured to the carriage or, alternatively, be independent thereof. Further, the birdhousing system may include a plurality of the birdhousing complexes.

These and other objects of the present invention will become more readily appreciated and understood from a consideration of the following detailed description of the exemplary embodiments of the present invention when taken together with the accompanying drawings, in which:

DETAILED DESCRIPTION OF THE EXEMPLARY EMBODIMENTS

The present invention broadly concerns housing systems which may be employed as a habitat for birds. The present invention is specifically directed to a housing system operative to provide a habitat for purple martins, a known community bird. The present invention provides a versatile system of multiple housing modules for individual families of purple martins with these modules being constructed so as to be assembled into floors with the multiple floors providing a housing complex for a large number of families of purple martins.

Figures 1, 2, 3, 4:
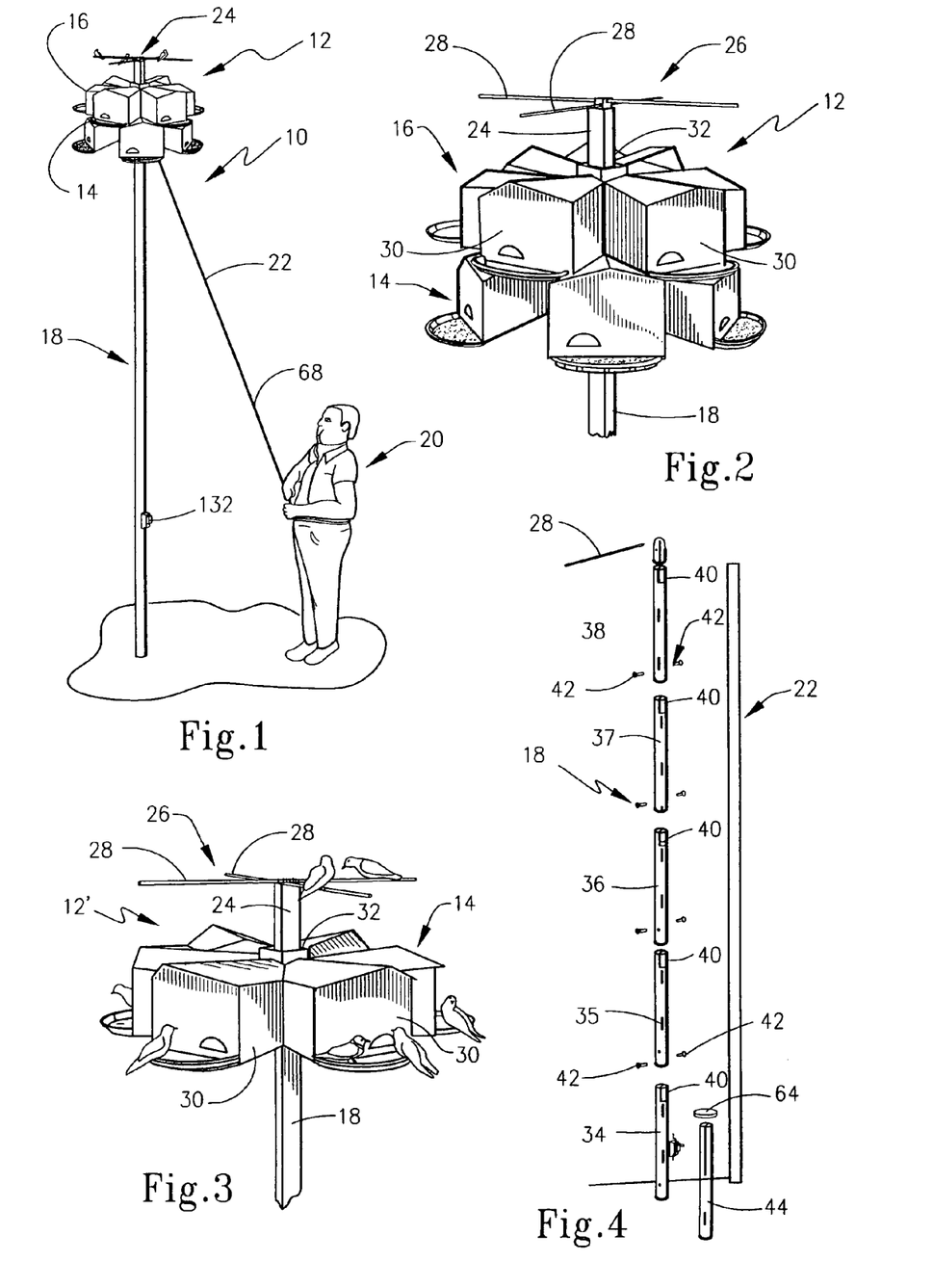
FIG. 1 is a perspective view showing the bird housing system according to a first exemplary embodiment of the present invention.
FIG. 2 is a perspective view of a housing complex according to the first exemplary embodiment of the present invention.
FIG. 3 is a perspective view of a floor assembly according to the present invention.
FIG. 4 is a perspective view of the pole assembly according to the present invention.

With reference first to FIG. 1, it may be seen that housing assembly 10 includes a housing complex 12 formed of two housing floors 14 and 16. Housing complex 12 is supported on a pole assembly 18 and may translate on pole assembly 18 from an elevated position, shown in FIG. 1 to a position that is readily accessible by a person 20. In order to raise and lower housing complex 12, the person 20 may operate a cord or rope 22 through a pulley assembly 24 described more thoroughly below.

With reference now to FIGS. 2 and 3, it should be appreciated that the housing complex 12 may be formed by a multiple number of floors, such as floors 14 and 16 illustrated in FIG. 2. Alternatively, the housing complex 12' may be formed by a single floor 14, as is illustrated in FIG. 3. As is illustrated in FIGS. 2 and 3, however, it may be seen that pulley assembly 24 mounts on the upper end of pole assembly 18 and is provided with upper perches 26 formed by a pair of perpendicular cross bars 28. Moreover, as is illustrated in each of FIGS. 2 and 3, each floor, such as floors 14 and 16, are formed by six housing modules 30 which are secured to and extend radially from a common carriage 32.

With reference now to FIG. 4, the structure of pole assembly 18 may be appreciated with greater understanding. Here, it may be seen that pole assembly 18 is formed by a plurality of mating sections 34-38. Each of these pole sections may be formed by a hollow tubular member that is square shaped in cross-section. Pole sections 34-38 are adapted to mate with one another, in any number, so as to provide an elongate pole of desired length adapted to be positioned in an upright state relative to a support surface. To this end, an upper portion of each pole section 34-38 is provided with a male insertion member 40 that is adapted for close fitted insertion into the opposite end of an adjacent pole section, and screws 42 may be used to secure adjacent pole sections together. Lower most pole section 34 mates onto a base member 44 that may be mounted to a support surface, such as by being embedded in the ground. A locking collar 64 mounts over the top of base member 44, which will be described in more detail below.

Figure 5:
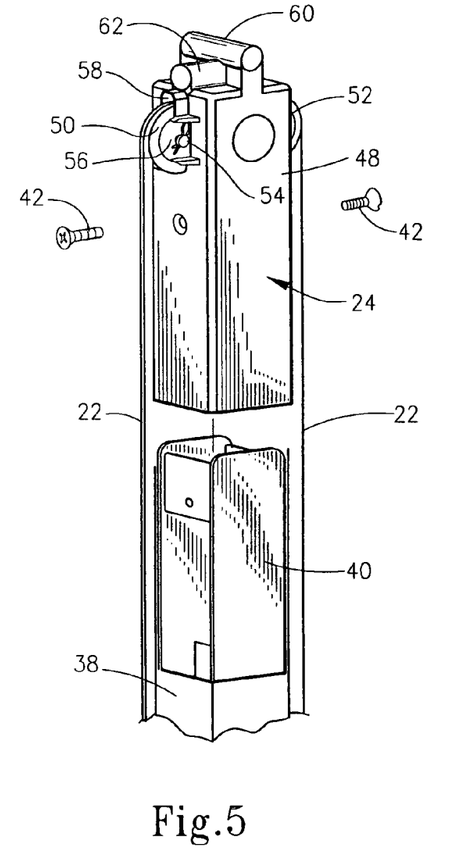
FIG. 5 is a perspective view of an upper portion of the pole assembly of the present invention particularly illustrating the pulley assembly used in conjunction therewith.
Figure 6:
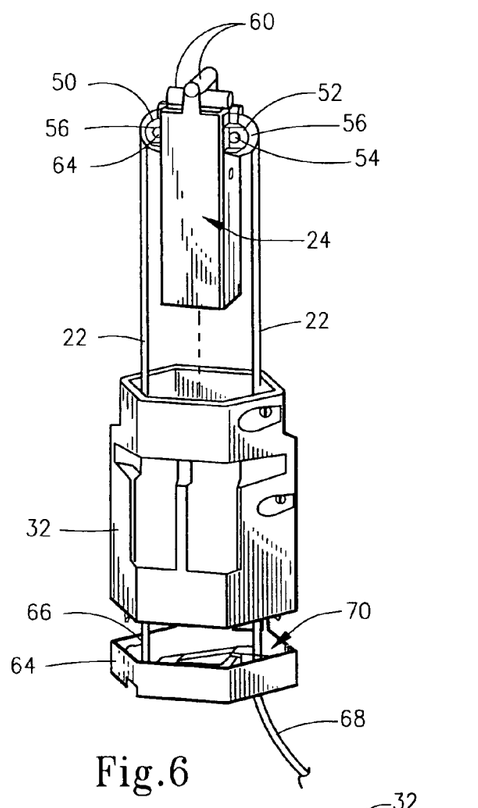
FIG. 6 is a perspective view of the pulley assembly shown in FIG. 5 interconnected to a carriage and a locking collar according to the present invention.

With reference now to FIGS. 5 and 6, it may be seen that pulley assembly 24 is adapted to mount onto the male insertion member 40 of an upper most pole section 38 so as to be disposed on the upper end portion of the assembled pole. Pulley assembly 24 includes a female housing 48 that is sized and adapted to mateably receive male insertion member 40 in a snug relationship, and screws 42 are again provided to secure female housing 48 to male insertion member 40. Female housing 48 supports a pair of pulleys 50 and 52 that are rotatably journaled on opposite sides of housing 48. To this end, axle pins 54 are mounted between opposed ears 56 so that pulleys 50 and 52 may freely rotate thereon. Cord 22 is then threaded across the tops of pulleys 50 and 52 through guide channel 58 so that it may freely translate across the top of pulley assembly 24. A pair of orthogonal sockets 60 and 62 are disposed at an upper end of female housing 48 with sockets 60 and 62 sized and adapted to receive crossbars 28 of upper perch 26. As is illustrated in FIG. 6, cord 22 extends downwardly alongside the pole sections 34-38 so that they freely pass through carriage 32 and engage a locking collar 64. More specifically, an end portion 66 of cord 22 is secured to locking collar 64 while another end portion 68 of cord 22 passes through a latch assembly 70 on locking collar 64, as described more thoroughly below.

Figure 7:
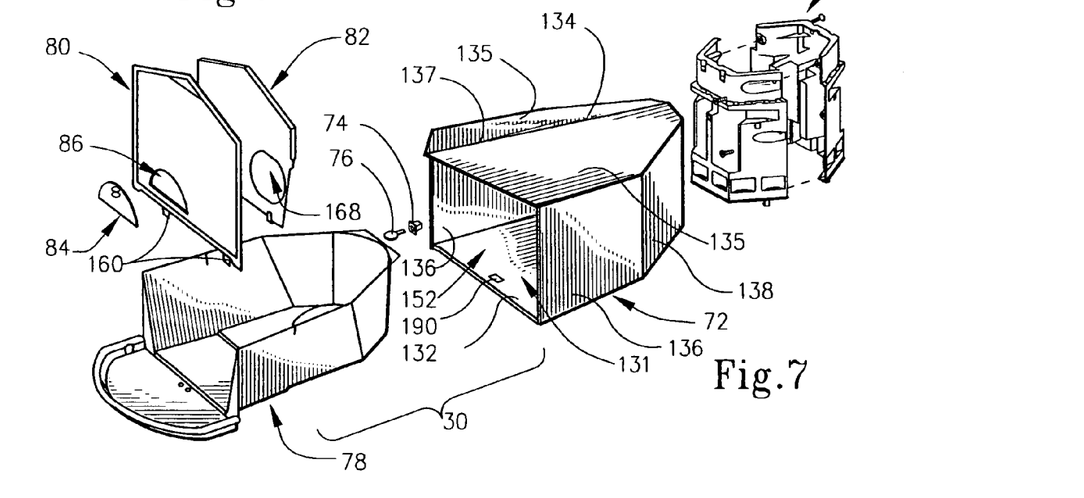
FIG. 7 is an exploded perspective view showing a housing module used to construct the floor assembly of FIG. 3 along with the carriage therefore.

With reference now to FIG. 7, it may be seen that each housing module 30 is adapted to be secured to carriage 32. As is illustrated in this figure, housing module 30 includes a housing shell 72 that may be secured to carriage 32 by means of a rivet 72 and rivet screw 76. Housing shell 72 slidably receives a nest drawer 78 therein with nest drawer 78 operative to receive both a front wall panel or entrance wall panel 80 and a predator guard panel 82. An auxiliary entrance plug 84 is provided that is sized and adapted to be removably secured relative to the entrance wall panel 80 thereby to selectively block or close entryway 86 formed through entrance wall panel 80 so as to prevent the ingress and egress of a bird into the drawer interior.

Figure 8:
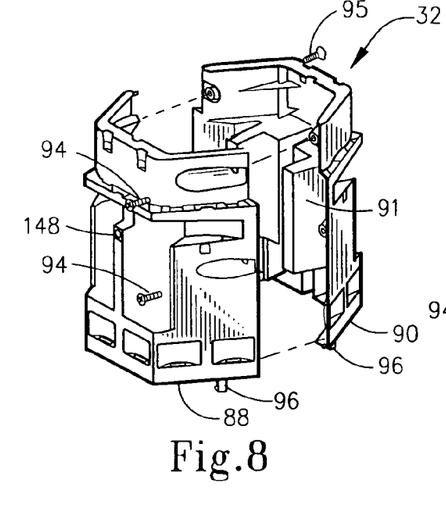
FIG. 8 is an exploded perspective view showing the carriage of FIG. 7.
Figure 9:
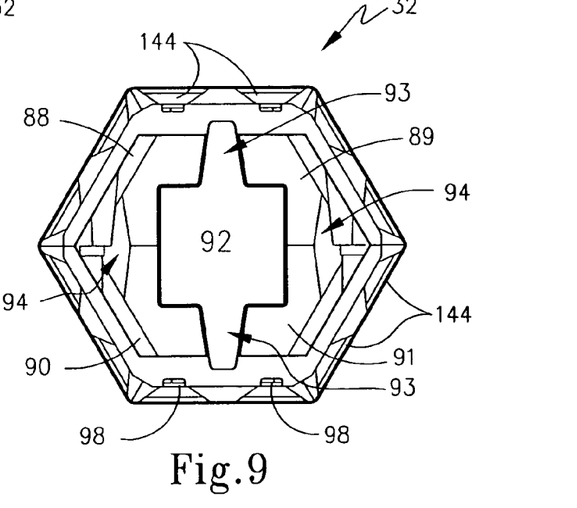
FIG. 9 is a top plan view of the assembled carriage of FIG. 8.

FIG. 8 shows an enlarged exploded view of the carriage of FIG. 7. As may be seen in FIGS. 7 and 8, carriage 32 is formed by a pair of connectable sections 88 and 90 when assembled, carriage 32 is in the form of a hexagonal body having six sides and a square shaped axial passageway 92 formed therethrough. Passageway 92 is sized such that carriage 32 may readily slide up and down on pole assembly 18. It should be appreciated that each of sections 88 and 90 are constructed identically so that they may be connected by means of screws 95. Passageway 92 is formed by block sections 89 and 92 which confront one another when in the assembled state as is shown in FIG. 9. Block sections 89 and 91 are constructed so as to leave a pair of spaced apart, longitudinally extending openings 94 on opposite sides thereof with these openings 94 being sized to accommodate the passage of cord 22 therethrough. A lower portion of carriage 32 supports a plurality of prongs 96 while an upper portion of carriage 32 has a plurality of engagement slots 98 so that two carriages may be secured together by interlocking the prongs 96 of an upper carriage into the engagement slots 98 of a lower carriage. This allows an assembly of multiple floors 14 and 16, as shown in FIG. 2. In so doing, it may be appreciated that each of the carriages are rotated ninety degrees with respect to one another. Passageway 92 has oppositely projecting channels 93 which align with passageway 94 of an adjacent carriage so as to accommodate cord 22.

Figure 10:
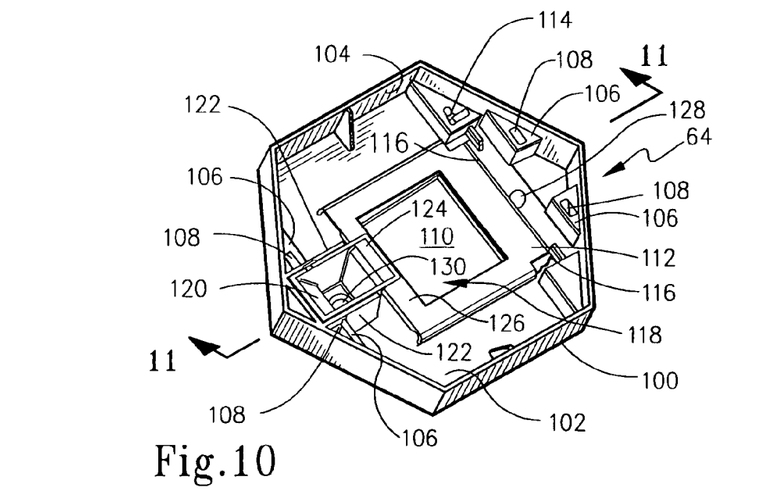
FIG. 10 is perspective view showing the inside of the locking collar of the present invention.
Figure 11:
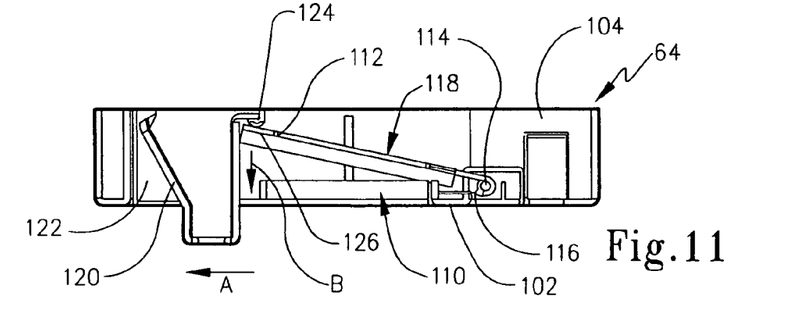
FIG. 11 is a cross-sectional view of the locking collar taken about lines 11-11 in FIG. 10.

Multiple carriages 32 may be employed on one pole assembly and the carriages may be releasably secured to one another. Whether a single carriage 32 is employed for a single floor-housing complex or whether multiple carriages are employed for a multi floor complex, the lower carriage is secured to a locking collar 64 that is best illustrated in FIGS. 10 and 11. Here, locking collar 64 includes a hexagonal body 100 that has a collar bottom wall 102 and an upstanding sidewall 104 that extends around the peripheral edge thereof. A plurality of standoffs 106 are supported by bottom wall 102 and sidewall 104. Each of standoffs 106 is provided with an engagement slot 108 that is oriented to engage prongs 96 on a lower portion of carriage 32 so that locking collar 64 is secured thereto. Bottom wall 102 is provided with a square shaped opening or passageway 110 that is centrally located and through which pole assembly 18 may be inserted. Locking collar 64 is associated with a latch mechanism that may generally include a spring loaded latch plate 112 and actuator lever 120.

Spring loaded latch plate 112 is pivotally mounted to body 100 by means of a pivot pin 114 and is biased upwardly by means of biasing springs 116. Latch plate 112 has a square shaped central passageway 118 that is generally of the same size as opening 110 in body 100. When latch plate 112 is moved into a parallel, confronting relationship with bottom wall 102 against the restoring force springs 116, openings 110 and 118 align so that locking collar 64 may freely slide on pole assembly 18. However, when latch plate 112 is released so that springs 116 move toward an angular position, latch plate 112 engages pole assembly 18 to mechanically lock locking collar 64 at a selected position.

As will now be described, cord 22 is provided both to release locking collar 64 and to raise and lower the housing complex 12. To this end, and with continued reference to FIGS. 10 and 11, an actuator lever 120 is pivotally mounted on trunnions between opposed plates 122 and includes a projection 124 which abuts distal portion 126 of latch plate 112. When actuator lever 120 moves in the direction of arrow "A", it advances latch plate 112 into a release position generally in the direction of arrow "B" wherein it confronts bottom wall 102. Releasing actuator lever 120 allows latch plate 112 to move into a latch state. This movement is controlled by cord 22. To this end, and with reference to both FIGS. 10 and 6, portion 66 of cord 22, descends from pulley assembly 24 and is passed through a hole 128 wherein it may be knotted. The opposite end portion 68 of cord 22 passes through hole 130 in actuator lever 120 and extends downwardly along the pole assembly where it may secured by means of a bracket 132 (FIG. 1). In use, as is illustrated in FIG. 1, a person disengages end portion 68 and pulls it outwardly to pivot actuator lever 120 so as to move latch plate 112 into the release position. By slowly releasing cord 22, housing complex 12 may be lowered on pole assembly 18. However, should cord 22 slip, latch plate 112 will immediately move to the latched state to prevent unwanted descent of the housing complex. Pulling on end portion 68 serves to elevate housing complex 12.

Figure 12:
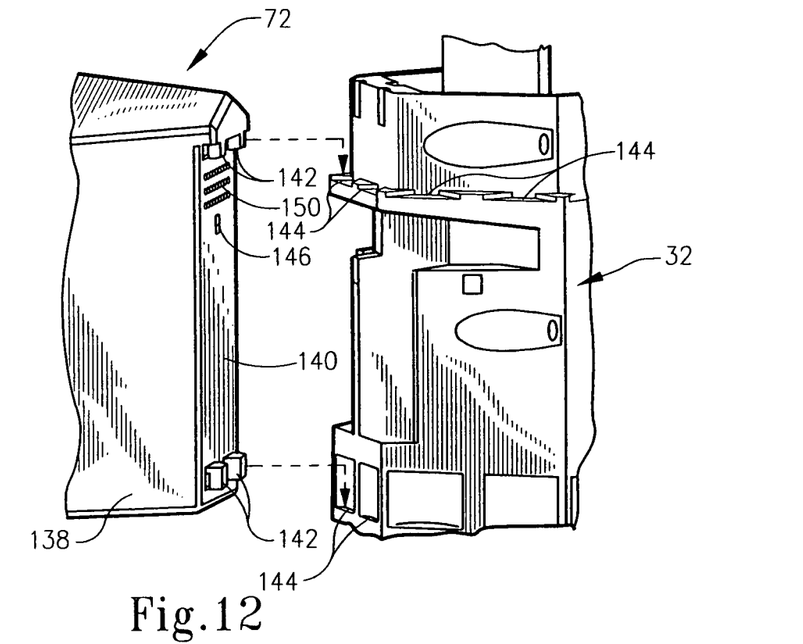
FIG. 12 is an exploded perspective view showing the interconnection of the housing shell of FIG. 7 to the carriage.
Figure 13:
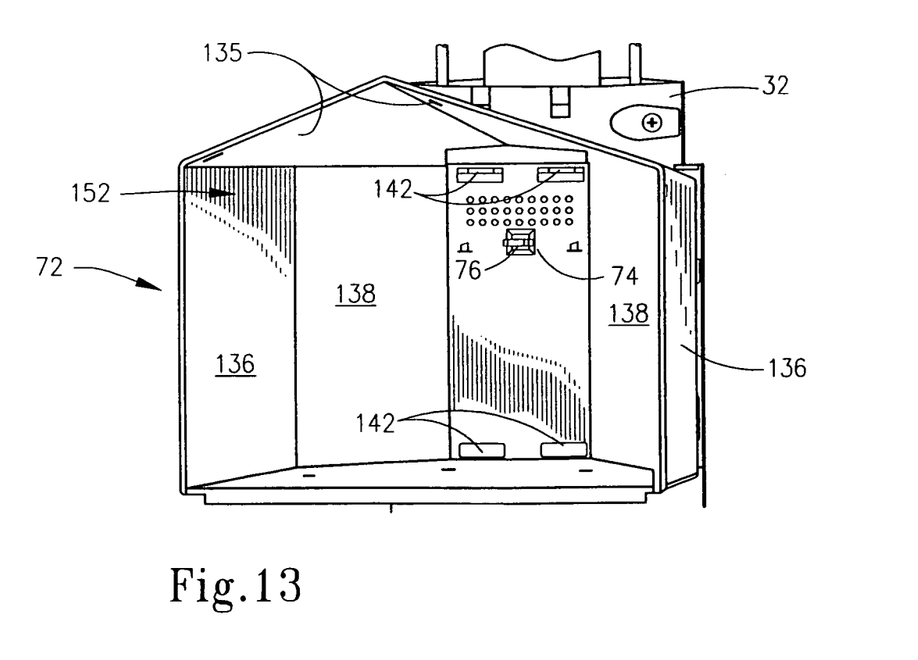
FIG. 13 is perspective view showing the interior of the housing shell used to create the housing module.

With reference now to FIGS. 7, 12 and 13, housing shell 72 and its connection to carriage 32 may be understood with greater specificity. In these figures, it may be seen that housing shell 72 is in the form of a generally hollow chamber having a shell bottom wall 132 a shell top wall 134 a pair shell sidewalls each including distal shell side wall sections 136 and proximal shell side wall sections 138. Housing shell 72 has a closed shell back, shown here in the form of shell back wall 140 and an open shell front 131 to define and open shell interior 152. Also, as may be shown, proximal side shell wall sections 138 extend outwardly from shell back wall 140 at an angle of approximately 60° to each other.

Moreover, as is seen in FIG. 7, top wall 134 is formed by a pair of shell top wall sections 135 which are formed along an eave 137. Back wall 140 is provided with downwardly projecting fingers 142 that are sized to mateably engage slots 144 located at the upper and lower ends of carriage 32. When assembled, rivet 74 may be inserted through square opening 146 in back wall 140 and through a square shaped hole 148 in carriage 32 (as shown in FIG. 8). Rivet screw 76 may then be fastened in rivet 74 so as to secure housing shell 72 to carriage 32. Moreover, as is seen in FIG. 12, back wall 140 is provided with a plurality of ventilation holes 150 to allow for the circulation of air in a bird nest built therein. It should be appreciated that the configuration of housing shell 32 is such that six shells may be positioned circumferentially around carriage 132 with proximal sidewalls 138 generally confronting one another. Moreover, it should be appreciated that housing shell 72 has an open interior 152 that is sized and adapted to receive nest drawer 78 therein.

Accordingly, with reference to FIGS. 7 and 14-18, it may be seen that nest drawer 78 has a pan shaped body 154 formed by a drawer bottom wall 156 and a pair of drawer sidewalls 158 and a closed drawer back 171 that is generally in the same shaped as the interior 152 of housing shell 72 so that pan shaped body 154 may be received in closed fitted engagement in interior 152 when in a mounted state. When in the mounted state, drawer bottom wall 156, drawer sidewalls 158, and closed drawer back 171 confront, respectively, shell bottom wall 132, shell sidewall walls and closed shell back.

Figure 16:
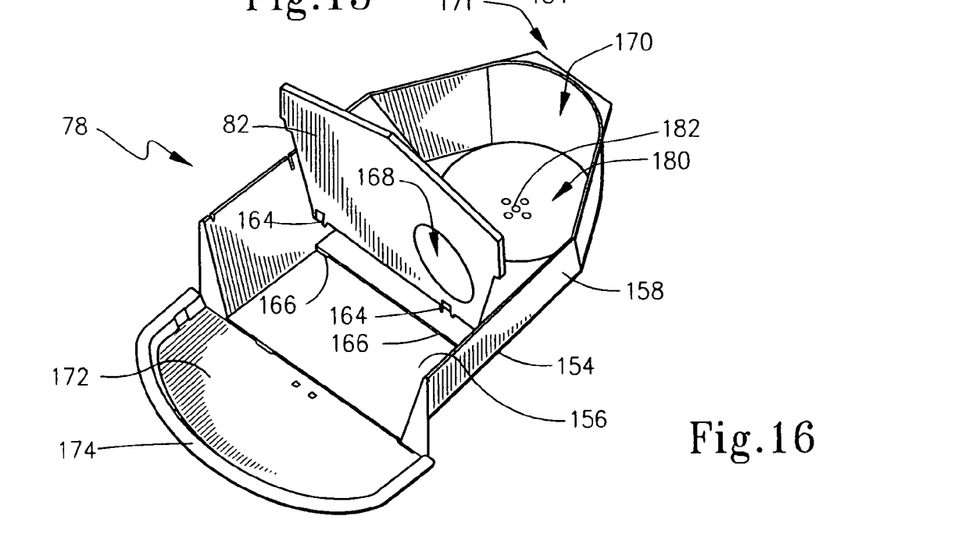
FIG. 16 is a perspective view of the nest drawer of the present invention with the predator guard being inserted therein.
Figure 17:
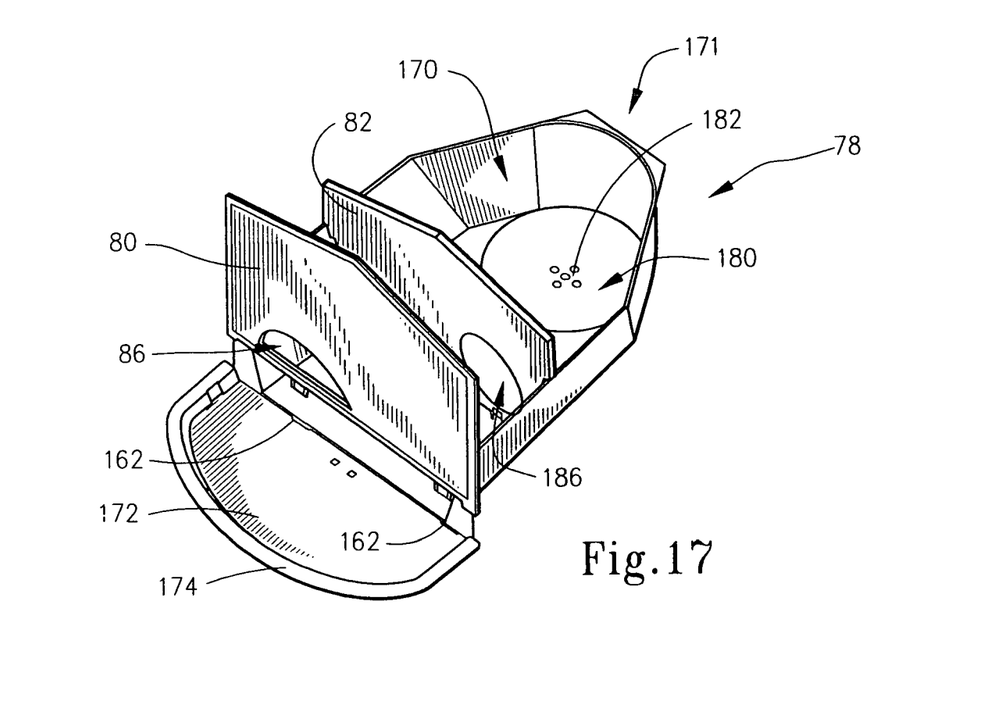
FIG. 17 is a perspective view, similar to FIG. 16, showing the nesting drawer with the predator guard mounted therein and with entrance wall being mounted thereto.

With reference to FIGS. 7, 16 and 17, it may be seen that entrance wall panel 80 is mounted at the front of body 154 and a predator guard panel 82 is mounted rearwardly of entrance wall panel 80 in parallel spaced relation therebetween. To this end, entrance wall panel 80 includes downwardly projecting tabs 160 that are sized to mate with slots 162. Similarly, predator guard panel 82 has downwardly projecting tabs 164 adapted to engage slots 166. Entrance wall panel 80 has an entryway 86 therethrough to allow the ingress and egress of a nesting bird while predator guard panel 82 includes an access port 168 that are offset with respect to one another. As shown, entryway 86 and access prt are laterally offset from each other. The orientation of entryway 86 and access port 186 in this way prevents a predator, such as an owl or other bird from accessing the birds located in nesting chamber 170 thus protecting the bird families from such predators.

As may be appreciated, nest draw is adapted to be slideably received in the open shell interior 152 of housing shell 72 and to be removable therefrom through the open shell front 131.

Figure 14:
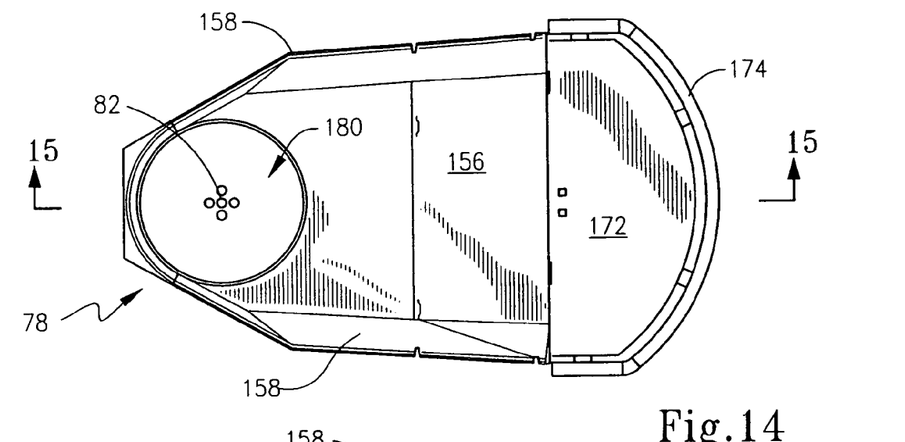
FIG. 14 is a top plan view showing the nest drawer which engages the housing shell.

With reference to FIGS. 14-17, it may be seen that bottom wall 156 is terraced and ends in a forwardly projecting flange 172 provided with a railing 174 that defines a perch for birds immediately on the exterior of a housing module 30. As may be seen in FIG. 15, third bottom wall or flange section 172 is located at a lower position than second bottom wall section, or distal section 176 of floor 156. Likewise, distal section 176 is located at a lower elevation than first bottom wall section or proximal section 172 of bottom wall 156. Thus, precipitation such as rain and the like, will not tend to run into nest drawer 78 during use. Moreover, as is seen in FIGS. 14, 16 and 17, proximal section 178 is provided with a concavity 180 for nesting birds. A plurality of drain apertures or holes 182 are centrally located in a surface depression shown here in the form of concavity 180. Holes 182 are sized and adapted to permit the drainage of liquids from the nesting region 170.

Figure 15:
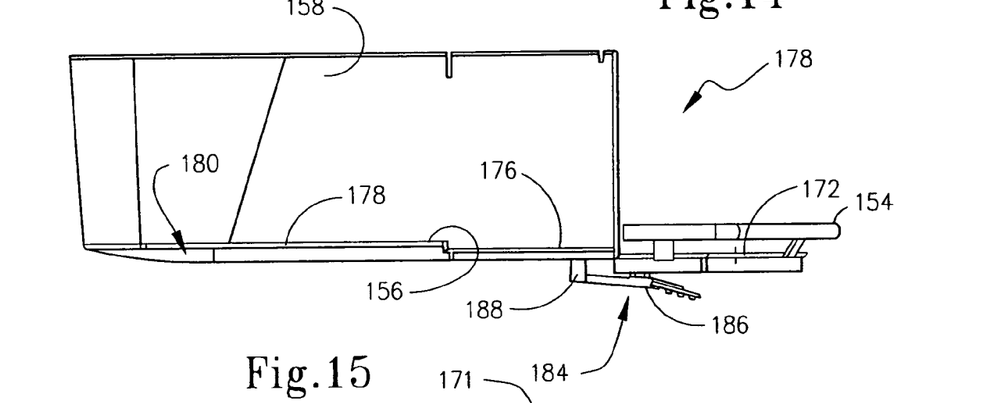
FIG. 15 is a cross-sectional view taken about lines 15-15 of FIG. 14.
Figure 18:
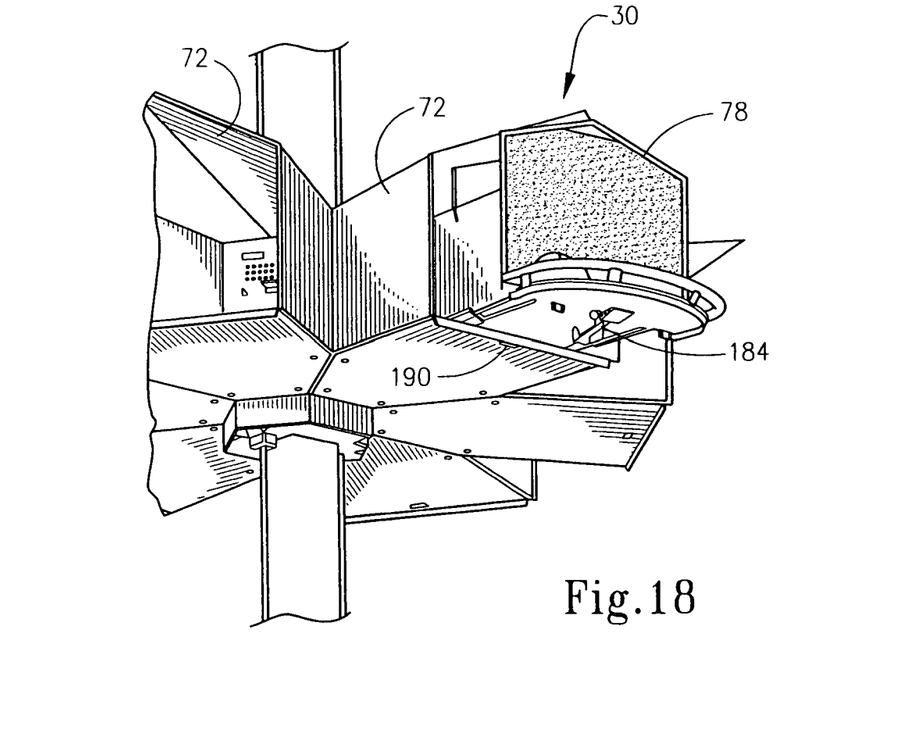
FIG. 18 is a bottom perspective view showing the insertion of the nesting drawer into the housing shell.

With reference now to FIG. 15 and 18, it may be seen that nest drawer 78 is secured in a mounted state inside of an interior 152 of housing shell 70 by means of a coupling member, shown here in the form of spring clip 184 that includes a pivot lever 186 that terminates in a prong 188 that is adapted to engage slot 190 in bottom wall 132 housing shell 72.

In operation, a user may lower housing complex 12 on pole assembly 18 by pulling on cord 22 to operate actuator lever 122 thereby to move latch plate 112 into a released position. Housing complex 12 may then be lowered so that the user may access housing modules 30 for care and maintenance. To this end, a user can actuate spring clip 184 so that a respective nest drawer 78 may be slid out of its respective housing shell 72 thereby allowing access to nesting region 170. If it is desired to close off the respective housing module, the user may place entrance plus 74 so as to enclose entryway 86. In any event, after performing the desired care or maintenance, the user simply slides nest drawer 78 into the interior of housing shell 72 so that spring clip 84 engages slot 190 to retain it therein. The user can then use cord 22 to elevate the nesting complex to the desired height on pole assembly 18 since latch plate 112 will grip pole assembly at any desired location.

Accordingly, the present invention has been described with some degree of particularity directed to the exemplary embodiments of the present invention. It should be appreciated, though, that the present invention is defined by the following claims construed in light of the prior art so that modifications or changes may be made to the exemplary embodiments of the present invention without departing from the inventive concepts contained herein.

What is claimed is:

1. A bird housing module adapted to provide a habitat for nesting birds, comprising:
   (A) a housing shell including a shell bottom wall, a shell top wall, a pair of shell side walls, a closed shell back and an open shell front to define a shell interior having an open front; and
   (B) a nest drawer adapted to be slideably received in the open front of the shell interior in a mounted state and to be removable from the shell interior through the open front of said housing shell, said nest drawer including an open front a drawer bottom wall, a pair of drawer side walls and a closed drawer back respectively confronting said shell bottom wall, said shell side walls and said shell back when in the mounted state, said nest drawer defining a drawer interior with an open top allowing access to the drawer interior; and
   an entrance wall panel removably received adjacent said nest drawer open front to cover said open front of said shell and having a single entryway therethrough sized to allow the ingress and egress of a nesting bird for which the housing module is intended.

2. A bird housing module according to claim 1 wherein said housing shell has a plurality of ventilation openings formed therethrough sized and adapted to permit the passage of air into and out of the drawer interior when in the mounted state.

3. A bird housing module according to claim 1, wherein each said side shell wall includes (A) a proximate shell side wall section adjacent to said closed shell back, said proximate shell side wall sections being oriented at angle of approximately 60° to each other; and (B) a distal shell sidewall section adjacent to said proximate shell sidewall section.

4. A bird housing module according to claim 1 wherein said shell top wall includes a pair of shell top wall sections formed along an eave.

5. A bird housing module according to claim 1 wherein said nest drawer includes a predator guard panel rearwardly of said entrance wall panel and in spaced relation thereto, said predator guard panel sized and adapted to obstruct access of a predator into the drawer interior while permitting access therein by a nesting bird.

6. A bird housing module according to claim 5, wherein said predator guard panel includes an access port formed therethrough to allow the ingress and egress of a nesting bird, said access port being laterally offset from the entryway in said entrance wall panel.

7. A bird housing module according to claim 1 wherein said drawer bottom wall has a surface depression to generally define a nesting region within the drawer interior.

8. A bird housing module according to claim 7 wherein said drawer bottom wall includes a plurality of drainage apertures formed therethrough that are sized and adapted to permit the drainage of liquids from the nesting region, said drainage apertures being generally located in the surface depression.

9. A bird housing module according to claim 1 wherein said drawer bottom wall is terraced so as to include: (A) a first bottom wall section located proximate to said closed drawer back; and (B) a second bottom wall section extending forwardly of said first bottom wall section and located at a lower position relative thereto.

10. A bird housing module according to claim 9 wherein said bottom wall includes a third bottom wall section extending forwardly of said second bottom wall section and located at a lower position relative thereto.

11. A bird housing module according to claim 10 wherein said third bottom wall section terminates in a railing to define a perch for a bird.

12. A bird housing module according to claim 1 including an entrance plug sized and adapted to be removably secured relative to said entrance wall panel thereby to block the entryway in said entrance wall panel so as to prevent the ingress and egress of a bird into the drawer interior.

13. A bird housing module according to claim 1 including a coupling member adapted to releasably secure said nest drawer in said housing shell when in the mounted state.

14. A bird housing module according to claim 13 wherein said coupling member is a spring clip supported by said drawer bottom wall and releasably engaged with said shell bottom wall.

15. A bird housing module according to claim 1 wherein the nesting bird for which the housing module is intended is a purple martin, said single entryway being sized to allow the ingress and egress of said purple martin.

16. A bird housing module adapted to provide a habitat for nesting birds, comprising:
a housing shell including a shell bottom wall, a shell top wall, a pair of shell side walls, a closed shell back and an open shell front to define an enclosed shell interior with an open front;
a nest drawer adapted to be slideably received in the open front of the shell interior in a mounted state and to be removable from the shell interior through the open front of said housing shell, said nest drawer including a drawer bottom wall, a pair of drawer side walls and a closed drawer back respectively confronting said shell bottom wall, said shell side walls and said shell back when in the mounted state, said nest drawer defining a drawer interior with an open top allowing access to the drawer interior;
an entrance wall panel positioned to cover said open front and having an entryway therethrough to allow the ingress and egress of a nesting bird; and
a predator guard panel positioned in said nest drawer rearwardly of said entrance wall panel and in spaced relation thereto, said predator guard panel being sized and adapted to obstruct access of a predator into the drawer interior while permitting access therein by a nesting bird.

17. A bird housing module according to claim 16 wherein said housing shell has a plurality of ventilation openings formed therethrough sized and adapted to permit the passage of air into and out of the drawer interior when in the mounted state.

18. A bird housing module according to claim 16 wherein each said side shell wall includes (A) a proximate shell side wall section adjacent to said closed shell back, said proximate shell side wall sections being oriented at angle of approximately 60° to each other; and (B) a distal shell sidewall section adjacent to said proximate shell sidewall section.

19. A bird housing module according to claim 16 wherein said shell top wall includes a pair of shell top wall sections formed along an eave.

20. A bird housing module according to claim 16 wherein said predator guard panel includes an access port formed therethrough to allow the ingress and egress of a nesting bird, said access port being laterally offset from the entryway of said entrance wall panel.

21. A bird housing module according to claim 16 wherein said drawer bottom wall has a surface depression to generally define a nesting region within the drawer interior.

22. A bird housing module according to claim 21 wherein said drawer bottom wall includes a plurality of drainage apertures formed therethrough that are sized and adapted to permit the drainage of liquids from the nesting region, said drainage apertures being generally located in the surface depression.

23. A bird housing module according to claim 16 wherein said drawer bottom wall is terraced so as to include a first bottom wall section located proximate to said closed drawer back, and a second bottom wall section extending forwardly of said first bottom wall section and located at a lower position relative thereto.

24. A bird housing module according to claim 23 wherein said bottom wall includes a third bottom wall section extending forwardly of said second bottom wall section and located at a lower position relative thereto.

25. A bird housing module according to claim 24 wherein said third bottom wall section terminates in a railing to define a perch for a bird.

26. A bird housing module according to claim 16 including an entrance plug sized and adapted to be removably secured relative to said entrance wall panel thereby to block the entryway of said entrance wall panel so as to prevent the ingress and egress of a bird into the drawer interior.

27. A bird housing module adapted to provide a habitat for nesting birds, comprising:
a housing shell including a shell bottom wall, a shell top wall, a pair of shell side walls, a closed shell back and an open shell front to define an enclosed shell interior with an open front; and
a nest drawer adapted to be slideably received in the open front of the shell interior in a mounted state and to be removable from the shell interior through the open front of said housing shell, said nest drawer including a drawer bottom wall, a pair of drawer side walls and a closed drawer back defining a drawer interior with an open top that is covered by said shell top wall in the mounted state;
an entrance wall panel configured to cover said open front in the mounted state and having an entryway therethrough sized to allow the ingress and egress of a nesting bird; and
said drawer bottom wall being terraced so as to include a first bottom wall section located proximate to said closed drawer back, and a second bottom wall section extending forwardly of said first bottom wall section and located at a lower position relative thereto.

28. A bird housing module according to claim 27 wherein said bottom wall includes a third bottom wall section extending forwardly of said second bottom wall section and located at a lower position relative thereto.

29. A bird housing module according to claim 28 wherein said third bottom wall section terminates in a railing to define a perch for a bird.

30. A bird housing module adapted to provide a habitat for nesting birds, comprising:
a housing shell including a shell bottom wall, a shell top wall, a pair of shell side walls, a closed shell back and an open shell front to define an enclosed shell interior with an open front; and
a nest drawer adapted to be slideably received in the open front of the shell interior in a mounted state and to be removable from the shell interior through the open front of said housing shell, said nest drawer including a drawer bottom wall, a pair of drawer side walls and a closed drawer back defining a drawer interior that is covered by said shell top wall in the mounted state;
an entrance wall panel configured to cover said open front in the mounted state and having an entryway therethrough sized to allow the ingress and egress of a nesting bird; and
a first section of said drawer bottom wall located proximate to said closed drawer back and a second section of said bottom wall extending forwardly of said first bottom wall section and located proximate said entrance wall panel, said first bottom wall section having a centrally positioned surface depression to generally define a nesting region within the drawer interior proximate said closed drawer back, said surface depression having a plurality of drainage apertures formed therethrough that are sized and adapted to permit the drainage of liquids from the nesting region.

31. A bird housing module according to claim 30 wherein said drawer bottom wall ends in a forwardly projecting flange having a railing thereon that defines a perch for birds.

32. A bird housing module according to claim 31 wherein said perch is positioned forwardly of said entrance wall panel and outside said drawer interior.

33. A bird housing module according to claim 31 wherein said first section of said drawer bottom wall is higher than said second section of said bottom wall, said flange being located at a lower position than said second bottom wall section.

34. A bird housing module according to claim 30 wherein said entrance wall panel is removable.

35. A bird housing module according to claim 34 wherein said entrance wall panel includes downwardly projecting tabs that mate with corresponding slots in the housing shell.

36. A bird housing module according to claim 1 wherein a height of said entrance wall panel is greater than a height of said drawer side panels.

37. A bird housing module according to claim 36 wherein said entrance wall panel extends upwardly so as to be immediately adjacent the shell top wall in the mounted state.

* * * * *